United States Patent
Moran et al.

(10) Patent No.: US 10,273,010 B2
(45) Date of Patent: Apr. 30, 2019

(54) SYSTEMS AND METHODS FOR REFRIGERATING GALLEY COMPARTMENTS

(71) Applicant: The Boeing Company, Chicago, IL (US)

(72) Inventors: Thomas J. Moran, Lake Stevens, WA (US); David M. Rumill, Greenbank, WA (US)

(73) Assignee: The Boeing Company, Chicago, IL (US)

( * ) Notice: Subject to any disclaimer, the term of this patent is extended or adjusted under 35 U.S.C. 154(b) by 1147 days.

(21) Appl. No.: 14/017,494

(22) Filed: Sep. 4, 2013

(65) Prior Publication Data

US 2015/0065024 A1    Mar. 5, 2015

(51) Int. Cl.
*B64D 13/04* (2006.01)
*B64D 13/08* (2006.01)
(Continued)

(52) U.S. Cl.
CPC .......... *B64D 13/04* (2013.01); *B64D 11/0007* (2013.01); *B64D 11/04* (2013.01);
(Continued)

(58) Field of Classification Search
CPC .... B64D 11/0007; B64D 11/04; B64D 13/04; B64D 13/08; F25D 13/04; F25D 17/045; B64B 13/04
(Continued)

(56) References Cited

U.S. PATENT DOCUMENTS 3,711,044 A * 1/1973 Matulich ................ B64D 13/06
  165/212
4,361,014 A * 11/1982 Blain .................... A47J 39/006
  62/237
(Continued)

FOREIGN PATENT DOCUMENTS

DE    19952523       5/2001
DE    102005049688   4/2007
(Continued)

OTHER PUBLICATIONS

Search Report for EP 14183463, dated Jan. 30, 2015.
English translation of Office Action for Chinese App No. 2014104472181, dated Aug. 31, 2017.

*Primary Examiner* — Steven B McAllister
*Assistant Examiner* — Samantha A Miller
(74) *Attorney, Agent, or Firm* — Joseph M. Butscher; The Small Patent Law Group, LLC (57) ABSTRACT

A refrigeration system for providing cooled air to a plurality of galley compartments. The refrigeration system includes a plurality of galley compartments configured to receive therein at least one galley cart, a refrigeration unit configured to supply cooled air to the plurality of galley compartments, and an airflow supply and return system coupling the refrigeration unit to the plurality of compartments. The refrigeration system also includes a plurality of valves coupled in the airflow supply and return system for controlling flows of the cooled air through airflow supply and return system, each valve of the plurality of valves associated with a compartment of the plurality of compartments and a controller in control communication with the plurality of valves, the controller configured to control the plurality of valves to achieve a first temperature in a first galley compartment of the plurality of galley compartments and a second temperature in a second galley compartment of the (Continued)

plurality of galley compartments, the first temperature being different than the second temperature.

33 Claims, 4 Drawing Sheets (51) Int. Cl.
   *B64D 11/00* (2006.01)
   *B64D 11/04* (2006.01)
   *F25D 17/04* (2006.01)
   *F25D 15/00* (2006.01)
   *F25D 17/06* (2006.01)
(52) U.S. Cl.
   CPC ............ *B64D 13/08* (2013.01); *F25D 15/00* (2013.01); *F25D 17/045* (2013.01); *F25D 17/06* (2013.01); *F25D 2700/08* (2013.01)
(58) Field of Classification Search
   USPC .............................................. 454/74, 71, 76
   See application file for complete search history.

(56) References Cited

U.S. PATENT DOCUMENTS

| | | | | |
|---|---|---|---|---|
| 6,189,831 | B1* | 2/2001 | Asai | B64D 11/0023 244/118.5 |
| 6,413,159 | B1* | 7/2002 | Bates, III | B64D 13/00 454/301 |
| 6,619,589 | B2* | 9/2003 | Brasseur | B60H 1/00371 244/118.5 |
| 6,684,657 | B1* | 2/2004 | Dougherty | A47J 39/003 165/918 |
| 6,845,627 | B1 | 1/2005 | Buck | |
| 6,975,958 | B2 | 12/2005 | Bohrer et al. | |
| 7,024,874 | B2 | 4/2006 | Zywiak et al. | |
| 7,231,778 | B2 | 6/2007 | Oswald | |
| 7,234,510 | B1* | 6/2007 | Gilevich | G01N 23/10 165/104.33 |
| 7,721,564 | B2 | 5/2010 | Rizzo | |
| 7,823,834 | B2* | 11/2010 | French | B64C 1/1469 244/129.4 |
| 7,871,038 | B2* | 1/2011 | Space | B64D 13/06 244/118.5 |
| 7,980,928 | B2* | 7/2011 | Markwart | B64D 13/06 237/12.3 A |
| 8,015,973 | B2* | 9/2011 | Geary | B64D 13/06 128/202.22 |
| 8,151,582 | B2 | 4/2012 | Oswald | |
| 8,571,726 | B2* | 10/2013 | Gray | B64D 13/04 454/70 |
| 2003/0042361 | A1 | 3/2003 | Simadiris | |
| 2005/0193760 | A1* | 9/2005 | Moran | F25D 11/003 62/371 |
| 2008/0155993 | A1* | 7/2008 | Kuehl | F25B 25/00 62/3.6 |
| 2008/0242212 | A1* | 10/2008 | El-Galley | F24F 7/06 454/258 |
| 2008/0290217 | A1* | 11/2008 | Ghoreishi | B64C 1/18 244/129.4 |
| 2010/0029190 | A1* | 2/2010 | Dessero | B64D 13/08 454/76 |
| 2010/0050665 | A1 | 3/2010 | Oswald | |
| 2010/0203818 | A1* | 8/2010 | Gray | B64D 13/04 454/74 |
| 2010/0240290 | A1* | 9/2010 | Markwart | B64D 13/00 454/71 |
| 2011/0183595 | A1* | 7/2011 | Liebich | B64D 13/02 454/70 |
| 2011/0237173 | A1* | 9/2011 | Kelnhofer | B64D 13/08 454/76 |
| 2012/0130679 | A1 | 5/2012 | Fadell et al. | |
| 2013/0047657 | A1 | 2/2013 | Oswald et al. | |
| 2013/0099011 | A1 | 4/2013 | Matsuoka et al. | |
| 2013/0206905 | A1* | 8/2013 | Savian | B64D 11/003 244/118.5 |
| 2013/0210329 | A1* | 8/2013 | God | B64D 11/02 454/71 |
| 2013/0292102 | A1* | 11/2013 | Trumper | B64D 13/08 165/168 |
| 2013/0344789 | A1* | 12/2013 | Lee | B64D 13/08 454/76 |
| 2014/0009950 | A1* | 1/2014 | Savian | B64D 11/0015 362/471 |
| 2014/0248827 | A1* | 9/2014 | Keleher | B64D 13/00 454/76 |
| 2014/0349561 | A1* | 11/2014 | Reiss | B64D 13/00 454/76 |
| 2015/0028157 | A1* | 1/2015 | Hoogeveen | B64D 11/0007 244/118.1 |
| 2015/0059363 | A1* | 3/2015 | Burd | B62B 5/0447 62/3.62 |
| 2015/0059384 | A1* | 3/2015 | Burd | |
| 2015/0059385 | A1* | 3/2015 | Burd | |
| 2015/0151842 | A1* | 6/2015 | Weixler | B64D 11/04 454/76 |

FOREIGN PATENT DOCUMENTS

| | | | | |
|---|---|---|---|---|
| DE | 102005049688 A1 * | 4/2007 | ........ | G06K 19/0723 |
| EP | 2251260 | 11/2010 | | |
| GB | 2095387 | 9/1982 | | |
| WO | WO2012112356 | 8/2012 | | |

* cited by examiner

SYSTEMS AND METHODS FOR REFRIGERATING GALLEY COMPARTMENTS

BACKGROUND

The present disclosure relates generally to food storage units and, more particularly, to systems and methods for cooling airplane food storage compartments.

Airline meals are typically prepared in advance by caterers. In one approach, a caterer prepares a large quantity of individual meals and stores the meals in a refrigeration locker. In preparation for a flight, the caterer takes the required quantity of meals out of the locker and places the meals in aircraft galley carts. The caterer then transports the galley carts to the aircraft and loads the meals into a galley. The galley typically includes a plurality of refrigerated compartments or zones. Accordingly, one or more galley carts may be loaded into a single compartment.

In operation, a single refrigeration unit supplies cooled air to each of the compartments or zones via a plurality of ducts. Moreover, a single thermostat is used to maintain the temperature of the cooled air supplied to the plurality of compartments. The temperatures within each of the compartments are therefore not individually controlled. Thus, the temperature within each of the compartments is maintained at the temperature set by the single thermostat.

When the galley carts are removed from the compartments, for example to serve the food to the customers, the refrigeration unit continues to maintain the temperature within the compartment. More specifically, although cooling air is no longer required to cool a compartment, the refrigeration unit continues to provide the cooled air because the ducts, compartments, or zones cannot be individually controlled. As a result of the unnecessary cooling, the refrigeration unit continues to consume a significant amount of electrical power from the aircraft power system. Moreover, the refrigeration unit may generate sufficient noise to cause some of the passengers discomfort during the flight.

SUMMARY

In accordance with one embodiment, a refrigeration system for providing cooled air to a plurality of galley compartments is provided. The refrigeration system includes a plurality of galley compartments configured to receive therein at least one galley cart, a refrigeration unit configured to supply cooled air to the plurality of galley compartments, and an airflow supply and return system coupling the refrigeration unit to the plurality of compartments. The refrigeration system also includes a plurality of valves coupled in the airflow supply and return system for controlling flows of the cooled air through airflow supply and return system, each valve of the plurality of valves associated with a compartment of the plurality of compartments and a controller in control communication with the plurality of valves, the controller configured to control the plurality of valves to achieve a first temperature in a first galley compartment of the plurality of galley compartments and a second temperature in a second galley compartment of the plurality of galley compartments, the first temperature being different than the second temperature.

In another embodiment, a method of operating a refrigeration system for providing cooled air to a plurality of compartments is provided. The method includes receiving, at a controller, a set of refrigeration system operational requirements, the refrigeration system including a refrigeration unit and a plurality of galley compartments, each of the plurality of galley compartments configured to receive therein at least one galley cart and receiving, at the controller, a set of meal temperature requirements based on the meals being stored in the galley compartments. The method further includes operating, using the controller, a plurality of valves to achieve a first temperature in a first compartment of the plurality of galley compartments and a second temperature in a second compartment of the galley plurality of compartments, the first temperature being different than the second temperature.

In a further embodiment, a controller for operating an aircraft refrigeration system is provided. The controller is programmed to receive a set of refrigeration system operation requirements, receive a set of meal temperature requirements, and operate the plurality of valves to achieve a first temperature in a first galley compartment of the plurality of compartments and a second temperature in a second galley compartment of the plurality of compartments, the first temperature being different than the second temperature.

The features and functions that have been discussed can be achieved independently in various embodiments or may be combined in yet other embodiments, further details of which can be seen with reference to the following description and drawings.

DETAILED DESCRIPTION

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Described herein are various embodiments of a refrigeration system configured to supply cooling air to a plurality of compartments via a network of cooling ducts. The network of cooling ducts includes a least one cooling duct supplying cooling air to each compartment. In various embodiments, the network of cooling ducts may include a plurality of cooling ducts supplying cooling air to a single compartment. For example, galley carts within a compartment may be cooled using an "air-over" method wherein cooling air supplied from a refrigeration unit is channeled around the galley carts within the compartment. Thus, for the air-over cooling method the network of ducts may include a single duct supplying cooling air to one or more galley carts within a single compartment. The galley carts within a compartment may also be cooled using an "air-through" method wherein cooling air from the refrigeration unit is channeled through each individual galley cart. Thus, for the air-through cooling method, the network of ducts may include a plurality of ducts supplying cooling air to a plurality of respective galley carts each located in a single compartment. In various embodiments, the refrigeration system described herein may also operate as a hybrid system wherein the galley carts within a compartment may be cooled using a combination of the "air-over" method and the "air-through" methods described herein.

The refrigeration system also includes a plurality of flow control elements, such as valves, to regulate the cooled air channeled through the network of cooling ducts. In some embodiments, a single valve is used to supply cooled air to a single compartment, such as a compartment used to store galley carts cooled using the "air-over" method. Optionally, a plurality of valves may be used to supply cooled air to a respective plurality of galley carts in a single compartment, such as galley carts cooled using the air-through cooling method. Thus, each individual valve may be used to regulate the cooled air supplied to a single galley cart. It should therefore be realized that galley carts within a single compartment may be regulated by, for example, opening, closing, or regulating the quantity of cooled air supplied to the individual galley cart. Additionally, the temperature of the galley carts or compartments may be controlled by controlling a quantity of cooled air supplied to the galley carts or the compartments. Additionally, and as described above, the plurality of flow control elements may be utilized to provide cooling air to the galley carts using a combination of the "air-over" method and the "air-through" methods described herein.

The refrigeration system also includes a controller that controls various portions of the refrigeration system. For example, the controller may be programmed to start and/or stop the refrigeration unit. The controller may also be used to position each respective valve to either a fully open position, a fully closed position, or some operational position between fully opened and fully closed. Thus, the refrigeration system is operable to separately cool compartments and zones in flow communication with the refrigeration unit. As such, in some embodiments the refrigeration unit continually discharges cooled air at a predetermined temperature and airflow which may be regulated by regulating a fan speed of the refrigeration unit, and/or operating the plurality of valves. Accordingly, the controllable valves may be provided in each duct, or set of ducts, to control the flow of cooled air to particular compartments or zones. Moreover, the controller is in communication with the valves and the refrigeration unit. Accordingly, the controller is configured to receive various inputs, pre-programmed rules, and/or user inputs and operate the valves and the refrigeration unit based on the various inputs.

Figure 1:
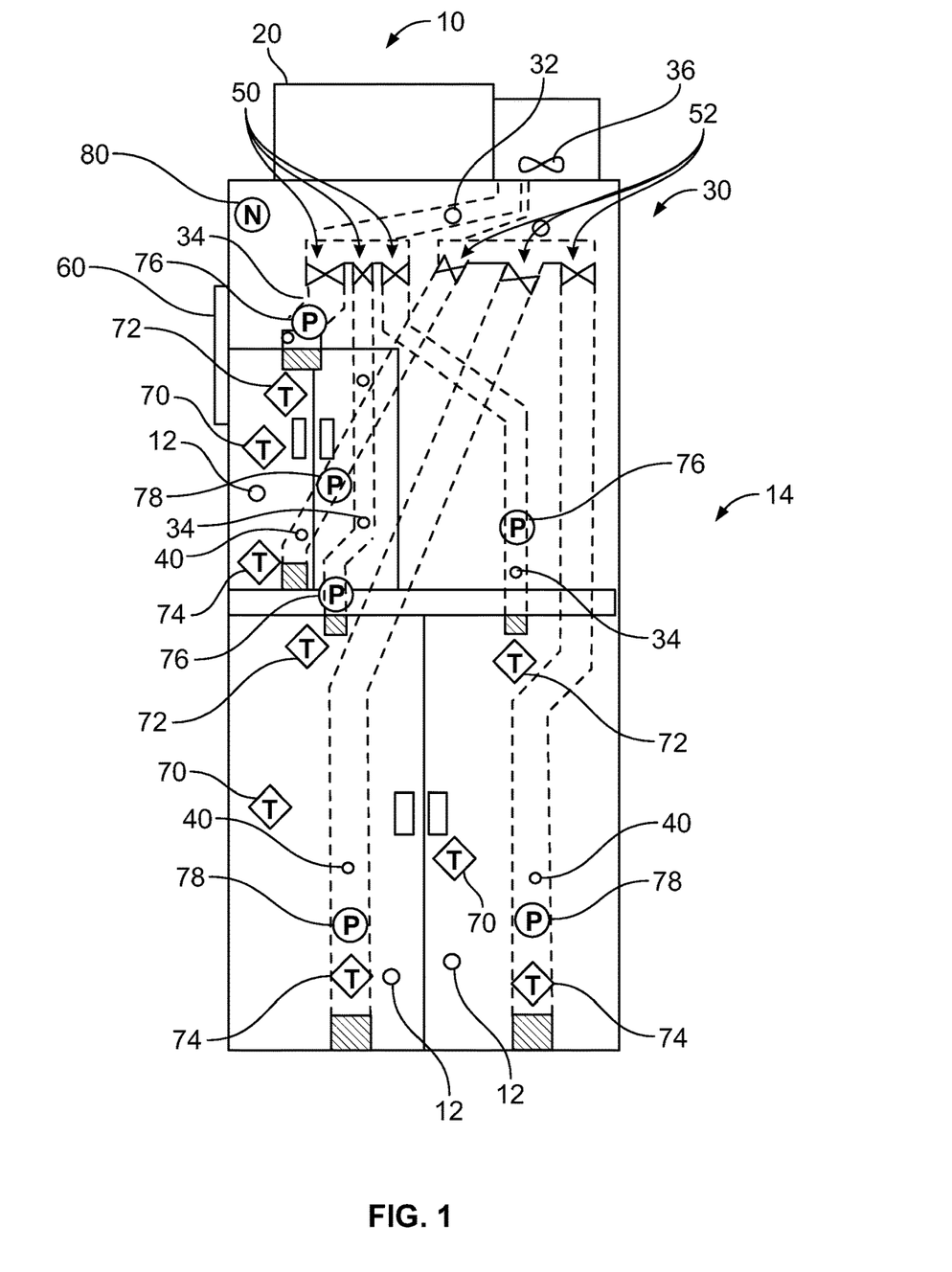
FIG. 1 is a schematic illustration of an exemplary refrigeration system formed in accordance with various embodiments.

FIG. 1 is a schematic illustration of an exemplary refrigeration system 10. In the illustrated embodiment, the refrigeration system 10 is described with respect to cooling galley carts or compartments 12 on an aircraft 14. A portion of the aircraft 14 is illustrated without passenger seats for ease of illustration. However, it should be realized that the refrigeration system 10 described herein may be utilized to supply cooling air to facilitate cooling a building, a home, or any other suitable structure, and the aircraft compartments 12 described herein correspond to such structures.

In the illustrated embodiment, the aircraft 14 includes three compartments 12. As used herein a compartment or zone is an insulated room that is utilized to store one or more galley carts on the aircraft 14. A galley cart, as used herein, is a portable device that is used to store food and/or beverages that are transported from a caterer to the aircraft 14 or from the compartments to other parts of the aircraft 14 for serving the food and/or beverages. Thus, a galley cart may be embodied as a device that includes a storage compartment and wheels to enable a user to reposition the galley to different positions on the aircraft. The galley cart may also be embodied as any portable storage container that may be hand carried to any part of the aircraft. It should be realized that the aircraft 14 may include more than three compartments 12 or less than three compartments 12. As discussed above, the refrigeration system 10 is configured to supply cooling air to each of the compartments 12 to facilitate cooling the compartments 12 or to facilitate cooling galley carts installed in the compartments 12. Various exemplary galley carts are described in more detail in FIG. 2.

The refrigeration system 10 includes a refrigeration unit 20. In operation, the refrigeration unit 20 is configured to supply cooled air to the compartments 12. In one embodiment, the refrigeration unit 20 includes an evaporator, a condenser, a compressor, and an expansion valve, not shown. In operation, a refrigerant, not shown, is compressed via the compressor. The compressed refrigerant is transmitted from compressor as a vapor at a higher temperature. The vapor is channeled through the condenser which condenses the vapor into a liquid by removing the heat acquired from the compartments 12 by the evaporator. The condensed vapor is then channeled through the expansion valve and back to the compressor. Thus, the refrigeration unit 20 is configured to remove heat from the compartments 12 thereby cooling or reducing the temperature of the compartments 12. It should be realized that different type of refrigeration units, such as known in the art, may be used to cool the compartments 12.

The refrigeration system 10 also includes an airflow supply and return system 30 that is configured to channel cooling air supplied by the refrigeration unit 20 to each of the compartments 12. The airflow supply and return system 30 is also configured to return the heated air from the compartments 12 to the refrigeration unit 20. Accordingly, the airflow supply and return system 30 includes an inlet plenum 32 that is coupled to a plurality of air supply ducts 34 that are each configured to supply cooled air to the compartments 12 using a fan 36. The fan 36 may be installed in the inlet plenum 32 as shown in FIG. 1. Optionally, the fan 36 may be installed at any location within the refrigeration system 10. The airflow supply and return system 30 includes a discharge plenum 38 that is coupled to a plurality of air return ducts 40 that are each configured to discharge air from the respective compartments 12 to the refrigeration unit 20. In the illustrated embodiment, each compartment 12 includes a single supply duct 34 and a single return duct 40. However, it should be realized that each compartment 12 may include more than one air supply duct 34 and/or more than one air return duct 40.

The airflow supply and return system 30 further includes a plurality of valves for controlling the movement or flow of cooling air through both the supply ducts 34 and the return ducts 40. More specifically, the airflow supply and return system 30 includes a plurality of supply valves 50 that are configured to control the airflow through the supply ducts 34. The airflow supply and return system 30 includes a plurality of return valves 52 that are configured to control the airflow through the return ducts 40. The supply and return valves 50 and 52 may be implemented as any type of valve that is capable of regulating airflow through a system. In the exemplary embodiment, the supply and return valves 50 and 52 are implemented as electrically actuated valves that may be controlled by a controller that is described in more detail below. The supply and return valves 50 and 52 are operable in either a fully open configuration, a fully closed position, or any operational position between fully open and fully closed. Accordingly, the supply and return valves 50 and 52 may be operated to enable cooled air to be supplied to the compartments 12 and returned from the compartments 12. Moreover, the supply and return valves 50 and 52 may be positioned to be partially opened or closed to regulate a quantity of cooled air being supplied to the compartments 12. Thus, in the illustrated embodiment, because the aircraft 14 includes three refrigerated compartments 12 being supplied with cooling air via three supply and return ducts 34 and 40, respectively, the airflow supply and return system 30 includes three supply valves 50 and three return valves 52. It should be realized that in various other embodiments, the quantity of supply valves 50 is not equal to the quantity of return valves 52. For example, the compartment 12 may be supplied with cooling air using two supply valves 50 and may discharge the cooling air from the compartment 12 using a single return valve 52. Optionally, the compartment 12 may be supplied with cooling air using a single supply valve 50 and may discharge the cooling air from the compartment 12 using two return valves 52. In the exemplary embodiment, the quantity of supply valves 50 is based on the desired quantity of cooling airflow being supplied to the compartment 12 and the quantity of return valves 52 is sufficient to enable substantially the same quantity of cooling air supplied to the compartment 12 to be discharged from the compartment 12. Moreover, using multiple supply valves 50 and multiple return valves 52 enables the refrigeration system 10 to provide further regulation of the quantity of cooling air being supplied to the compartment 12.

The refrigeration system 10 further includes a plurality of sensors that are configured to provide information to a controller 60 to enable the controller 60 to regulate the temperature of the compartments 12. In various embodiments, the sensors may include for example, a plurality of compartment temperature sensors 70, wherein at least one compartment temperature sensor 70 is installed in each respective compartment 12. In operation, the compartment temperature sensors 70 sense the temperature within each compartment 12 and provide real-time feedback to the controller 60 to enable the controller 60 to adjust or modify the operational temperature within each respective compartment 12.

The sensors may also include for example, a plurality of airflow supply temperature sensors 72, wherein at least one airflow supply temperature sensor 72 is installed within or proximate to each supply duct 34. In operation, the airflow supply temperature sensors 72 sense the temperature of the cooling air being supplied to each respective compartment 12 via the supply ducts 34 and provides real-time feedback to the controller 60 to enable the controller 60 to adjust or modify the operational temperature of the cooling air being supplied to the compartments 12.

The sensors may further include for example, a plurality of airflow return temperature sensors 74, wherein at least one airflow return temperature sensor 74 is installed within or proximate to each return duct 40. In operation, the airflow return temperature sensors 74 sense the temperature of the cooling air being discharged from the compartments 12 via the return ducts 40 and provide real-time feedback to the controller 60 to enable the controller 60 to adjust or modify the operational temperature of the cooling air being input to the compartments 12.

The sensors may also include for example, a plurality of airflow inlet pressure sensors 76 wherein at least one airflow inlet pressure sensor 76 is installed within or proximate to each supply duct 34. In operation, the airflow inlet pressure sensors 76 sense the pressure or volume of the cooling air being supplied to the compartments 12 via the supply ducts 34 and provide real-time feedback to the controller 60 to enable the controller 60 to adjust or modify the pressure of the cooling air being supplied to the compartments 12. Optionally, the sensors may include a flowmeter for measuring the flow of the cooling air being supplied to and/or returned from the compartments 12.

The sensors may also include for example, a plurality of airflow return pressure sensors 78 wherein at least one airflow return pressure sensor 78 is installed within or proximate to each return duct 40. In operation, the airflow return pressure sensors 78 sense the pressure of the cooling air being discharged from the compartments 12 via the return ducts 40 and provide real-time feedback to the controller 60 to enable the controller 60 to adjust or modify the pressure or volume of the cooling air being input to the compartments 12.

The sensors may also include for example, a noise sensor 80 that is installed proximate to the refrigeration unit 20. In operation, the noise sensor 80 senses the noise level, for example on a decibel scale, of the refrigeration unit 20 and/or the compartments 12 and provides real-time feedback to the controller 60 to enable the controller 60 to adjust or modify the operation of the refrigeration unit 20 based on the noise. For example, the controller 60 may reduce the operational speed of a compressor on the refrigeration unit 20 and/or the reduce the operational speed of the fan 36, among other operational functions, as is described in more detail below.

In operation, the outputs from the above described sensors are input to the controller 60. In one embodiment, the controller 60 utilizes the inputs from the sensors to facilitate maintaining the temperature within the compartments 12 based on a predetermined temperature. The overall operation of the controller 60 is described in more detail below.

In various embodiments, the controller 60 is mounted proximate to the refrigeration unit 20 or the compartments 12 to enable an operator to provide inputs to the controller 60. The controller 60 may be embodied as a computer. As used herein, the term "computer" may include any processor-based or microprocessor-based system including systems using microcontrollers, reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "computer".

In various embodiments, the controller 60 is operable to maintain the desired temperatures within each compartment 12 or within each galley cart as described in more detail below. Accordingly, the controller 60 is configured to receive inputs from the sensors described above, receive inputs from the operator, and/or receive inputs from the refrigeration unit 20, the fan 36, and the galley carts. More specifically, the controller 60 may receive an input by the operator to maintain the contents in one of the compartments 12 at a first predetermined temperature, and maintain the contents of a different compartment 12 at a second predetermined temperature that is different than the first predetermined temperature. In various embodiments, the contents may be embodied as food, beverages, and/or air. More specifically, when the contents are embodied as air, the galley cart 102 is considered to be empty and thus the cooling air being supplied to the empty galley cart 102 may be secured to enable additional cooling air to be supplied to the non-empty galley carts 102. In response, the controller 60 may evaluate the various sensor inputs and adjust the refrigeration unit 20, the fan 36, or various other components to maintain the compartments at the desired temperatures.

It should be noted that the various embodiments or portions thereof, such as the controller 60 may be implemented in hardware, software or a combination thereof. The various embodiments and/or components, for example, the controller 60 may be implemented as part of one or more computers or processors. The controller 60 may include a plurality of ports to enable displays, input devices, or other user interfaces to connect to the controller 60. Moreover, the controller 60 may include a radio frequency (RF) receiver/transmitter to enable information, such as an input from a galley cart, to be transmitted from and/or transmitted to the controller 60. The controller 60 may include Random Access Memory (RAM) and Read Only Memory (ROM). The controller 60 may further include a storage device, which may be a hard disk drive or a removable storage drive such as a solid state drive, optical disk drive, and the like. The storage device may also be other similar means for loading computer programs or other instructions into the controller 60. In various other embodiments, the controller 60 may be configured to receive inputs via the Internet using for example, a Wi-Fi connection or a hard-wired connection. Additionally, the controller 60 may be configured to couple to a local area network (LAN) and receive inputs from various devices either installed on the aircraft or located remotely form the aircraft. In further embodiments, the controller 60 may receive inputs from a cellular phone device or any other portable touchscreen device, such as a portable laptop computer, etc.

The controller 60 executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 2:
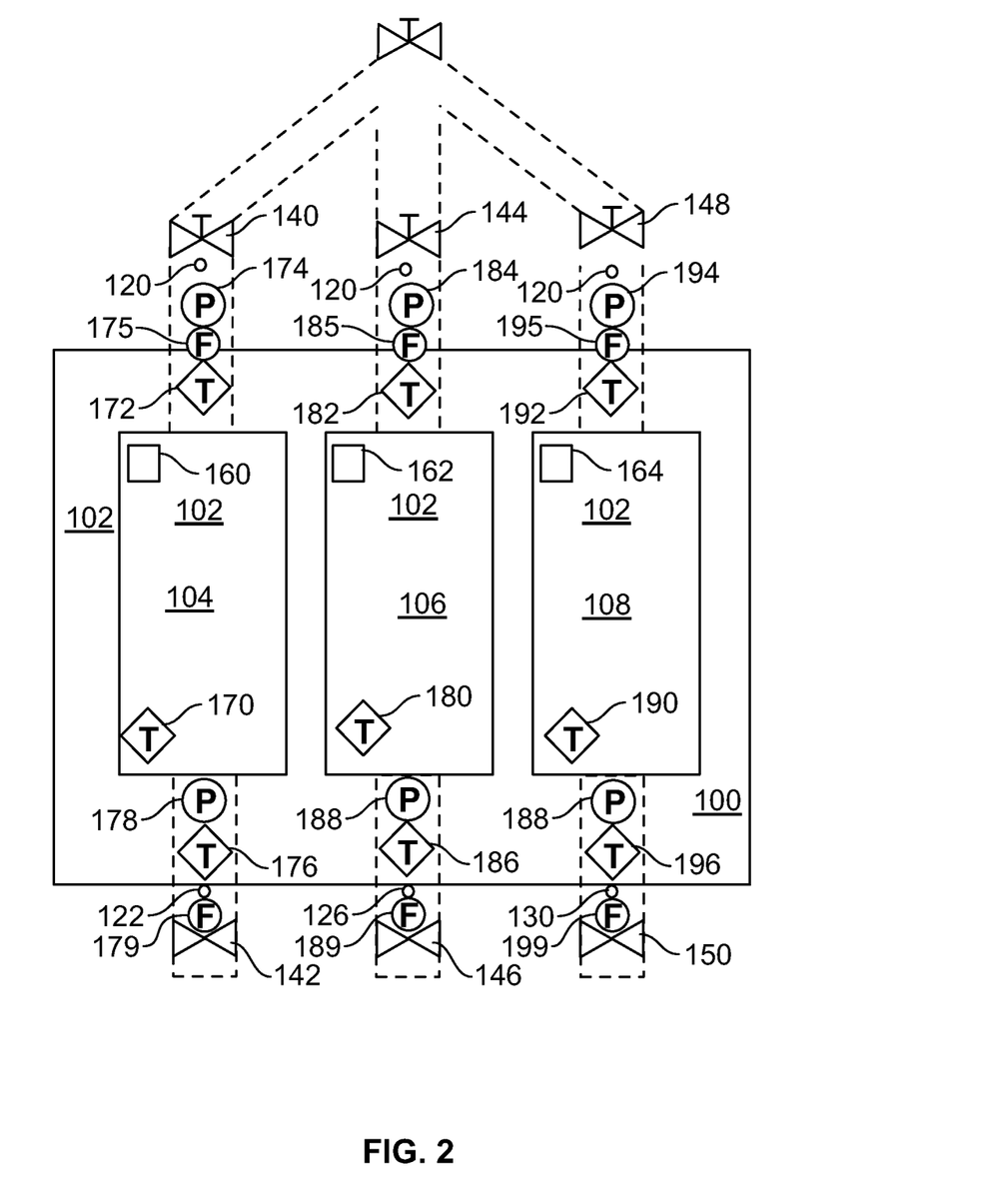
FIG. 2 is block diagram of an exemplary compartment formed in accordance with various embodiments.

FIG. 2 is a block diagram of an exemplary compartment 100 that may form, or be embodied as, one of the compartments 12 shown in FIG. 1. In the illustrated embodiment, the compartments 12 shown in FIG. 1 are cooled using the air-over method wherein the cooling air is channeled into each compartment to reduce the operational temperature of the compartments 12 and thus cool the temperature of the contents being stored within the compartments 12. In the illustrated embodiment, the compartments 12 shown in FIG. 1 each include a single supply duct 34 that is controlled by a single supply valve 50, and a single return duct 40 that is controlled by a single return valve 52. In various other embodiments, each compartment 12 may be supplied cooling air via a plurality of supply ducts 34 and/or a plurality of return ducts 40. Thus, in various embodiments, airflow through the plurality of supply ducts 34 to a single compartment may be controlled via one or more supply valves 50. Moreover, cooling airflow being discharged from the single compartment 12 via a plurality of return ducts 40 may be controlled by one or more return valves 52.

In the embodiment illustrated in FIG. 2, the contents within at least one of the compartments 12 may be cooled using the air-through method. More specifically, in the air-through method the cooling air supplied from the refrigeration unit 20 is configured to be channeled to each of a plurality of individual galley carts 102 being stored in a single compartment 100. Thus, the contents within each individual galley cart 102 may be maintained at different temperatures if desired. In the illustrated embodiment, the compartment 100 is configured to store three galley carts 104, 106, and 108, respectively. However, it should be realized that the compartment 100 may be configured to store more than three galley carts 102 or less than three galley carts 102.

Accordingly, in the illustrated embodiment, the refrigeration system 10 includes a supply duct 120 that is configured to supply cooling air from the refrigeration unit 20 to the galley cart 104 and a return duct 122 that is configured to return the cooling air from the galley cart 104 to the refrigeration unit 20. The refrigeration system 10 includes a supply duct 124 that is configured to supply cooling air from the refrigeration unit 20 to the galley cart 106 and a return duct 126 that is configured to return the cooling air from the galley cart 106 to the refrigeration unit 20. The refrigeration system 10 further includes a supply duct 128 that is configured to supply cooling air from the refrigeration unit 20 to the galley cart 108 and a return duct 130 that is configured to return the cooling air from the galley cart 108 to the refrigeration unit 20.

In various embodiments, the cooling air may be regulated to each individual galley cart 104, 106, and 108 such that each of the galley carts may be maintained at different operational temperatures if desired. Accordingly, the refrigeration system 10 also includes a supply valve 140 and a return valve 142 to regulate the cooling air supplied to and discharged from the galley cart 104, a supply valve 144 and a return valve 146 to regulate the cooling air supplied to and discharged from the galley cart 106, and a supply valve 148 and a return valve 150 to regulate the cooling air supplied to and discharged from the galley cart 108.

In various embodiments, the controller 60 receives an input that defines or sets the desired operational temperature of the galley carts 102, wherein various components within the refrigeration system 10 are then controlled to maintain the contents within the galley carts 102 at the desired temperatures. In one embodiment, the inputs to the controller 60 may include manual inputs by the operator. For example, the operator may select the galley cart 104 and enter a first temperature that instructs the refrigeration system 10 to maintain the galley cart 104 at the first temperature, such as based on the contents within the galley cart 104. The operator may select the galley cart 106 and enter a second temperature that instructs the refrigeration system 10 to maintain the galley cart 106 at the second temperature, such as based on different contents in the galley cart 106. Additionally, the operator may select the galley cart 108 and enter a third temperature that instructs the refrigeration system 10 to maintain the galley cart 108 at the third temperature.

In another embodiment, the controller 60 may receive an input from a radio frequency identification (RFID) tag that is coupled to each respective galley cart 102. For example, the galley cart 104 may include an RFID tag 162, the galley cart 106 may include an RFID tag 164, and the galley cart 108 may include an RFID tag 166. The RFID tags may be pre-programmed by the vendor supplying the food to the aircraft 14. Optionally, the RFID tags may be programmed by a user on the aircraft 14 prior to and/or during flight. In operation, the RFID tags enable the refrigeration system 10 to automatically determine a desired and/or required operational temperature for each of the galley carts 102 and operate the refrigeration system 10 to maintain each of the galley carts 102 at the desired and/or required operational temperature.

For example, in various embodiments, the galley cart 104 may be loaded with wine that is to be cooled at a first temperature, the galley cart 106 may be loaded with food that is to be cooled at a second temperature, and the third galley cart 108 may be empty. In this example, the controller 60 is configured to read the RFID tag 160 which transmits information that identifies the desired or required temperature for cooling the galley cart 104 storing the wine. The refrigeration system 10 also receives feedbacks from a temperature sensor 170 within the galley cart 104, a temperature sensor 172, a pressure sensor 174, and a flow sensor 175 within the supply duct 120, and a temperature sensor 176, a pressure sensor 178, and a flow sensor 179 within in the return duct 122. The controller 60 may monitor the feedbacks from the sensors 170, 172, 174, 175, 176, 178, and 179 in real-time and substantially continuously and/or periodically modify the operation of the refrigeration system 10 to maintain the galley cart 104 at the temperature requested by the RFID tag 160.

As described above with respect to the compartments 12, to modify the operational temperature of the galley cart 104, the refrigeration system 10 may regulate the supply and return cooling air transmitted to the galley cart 104 by opening and/or closing the supply valve 140 and/or the return valve 142. Optionally, the temperature of the galley cart 104 may be regulated by changing the operational speed of the fan 36 or by changing the temperature of the cooling air being discharged from the refrigeration unit 20.

Additionally, the controller 60 is configured to read the RFID tag 162 which transmits information that identifies the desired or required temperature for cooling the galley cart 106. The refrigeration system 10 also receives feedbacks from a temperature sensor 180 within the galley cart 106, a temperature sensor 182, a pressure sensor 184, and a flow sensor 185 within in the supply duct 124, and a temperature sensor 186, a pressure sensor 188, and a flow sensor 189 within in the return duct 126. The controller 60 then may monitor the feedbacks from the sensors 180, 182, 184, 185, 186, 188, and 189 in real-time and substantially continuously or periodically modify the operation of the refrigeration system 10 to maintain the galley cart 106 at the temperature requested by the RFID tag 162.

As described above, the refrigeration system 10 may regulate the supply and return cooling air transmitted to the galley cart 106 by opening and/or closing the supply valve 144 and/or the return valve 146. Optionally, the temperature of the galley cart 106 may be regulated by changing the operational speed of the fan 36 or by changing the temperature of the cooling air being discharged from the refrigeration unit 20.

Moreover, the controller 60 is configured to read the RFID tag 164 which transmits information that identifies the desired or required temperature for cooling the galley car 108. The refrigeration system 10 also receives feedbacks from a temperature sensor 190 within the galley cart 108, a temperature sensor 192, a pressure sensor 194, and a flow sensor 195 within the supply duct 128, and a temperature sensor 196, a pressure sensor 198, and a flow sensor 199 within in the return duct 130. The controller 60 may monitor the feedbacks from the sensors 190, 192, 194, 195, 196, 198, and 199 in real-time and substantially continuously or periodically and modify the operation of the refrigeration system 10 to maintain the galley cart 108 at the temperature requested by the RFID tag 166.

As described above, the refrigeration system 10 may regulate the supply and return cooling air transmitted to the galley cart 108 by opening and/or closing the supply valve 148 and/or the return valve 150. Optionally, the temperature of the galley cart 108 may be regulated by changing the operational speed of the fan 36 or by changing the temperature of the cooling air being discharged from the refrigeration unit 20.

Figure 3:
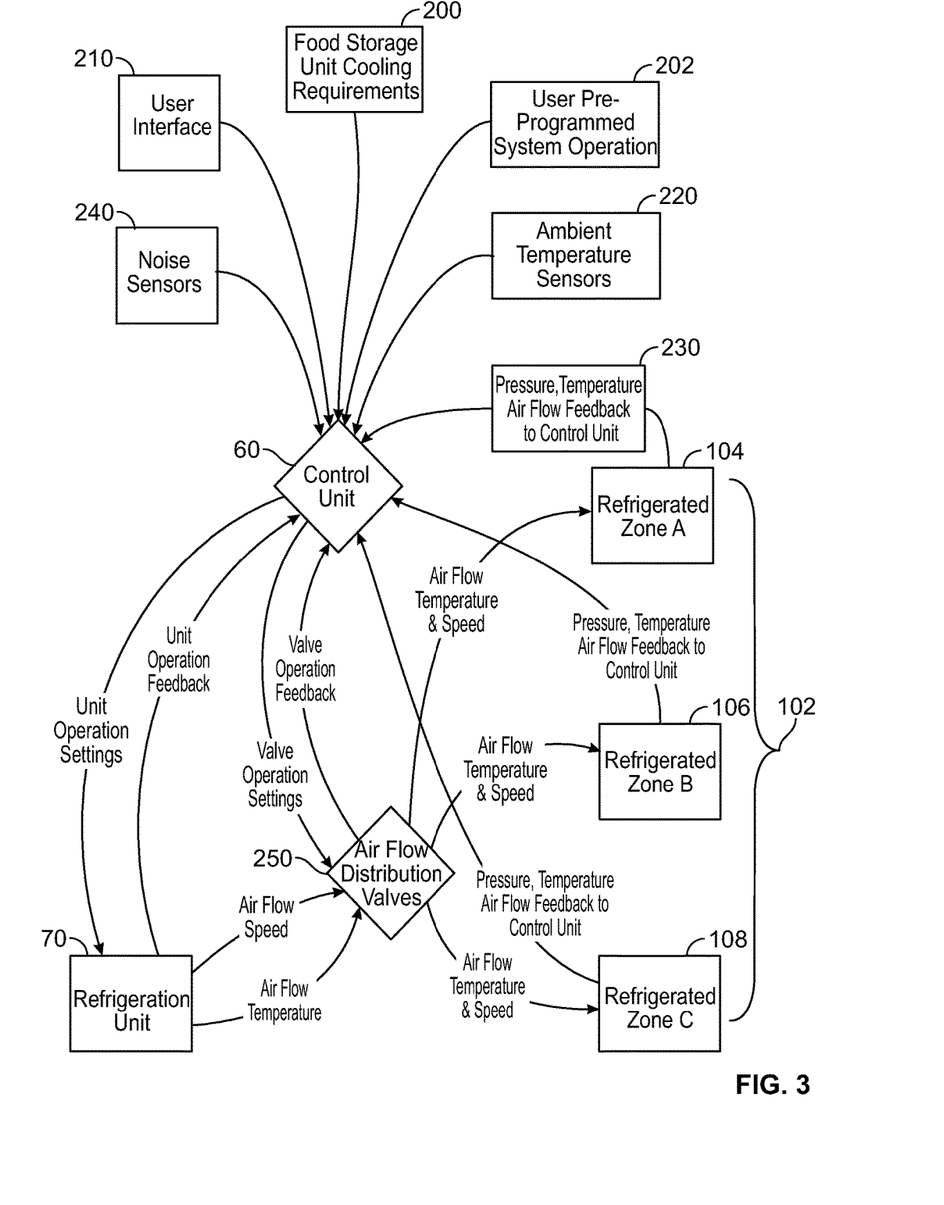
FIG. 3 is a functional schematic illustration of the refrigeration system shown in FIG. 1 in accordance with various embodiments.

FIG. 3 is a functional schematic illustration of the refrigeration system 10 shown in FIG. 1. As described above, the refrigeration system 10 includes the controller 60 which is configured to receive various inputs and maintain the temperature within the compartments 12 and/or the galley carts 102 based on the received inputs. In various embodiments, the controller 60 receive inputs from the operator that instruct the controller 60 to maintain each compartment 12 and/or galley cart 102 at a predetermined temperature.

The received inputs may be in the form of, for example, food storage unit cooling requirements 200. The food storage unit cooling requirements 200 may include for example, manual inputs from the operator designating a desired temperature for each of the compartments 12 and/or the galley carts 102. The desired temperature may be a range of temperatures. For example, the user may input a predetermined temperature for maintaining the galley cart 104 at a first temperature, the galley cart 106 at a second temperature, and the galley cart 108 at a third temperature. In various embodiments, the temperatures utilized to generate the cooling requirements 200 are based on the type of food or beverage being stored in the respective compartment 12, the current temperature of the food or beverage being stored in compartment 12, and/or the desired or required temperature of the food or beverage being stored in the compartment 12

The received inputs may also include pre-programmed system operational requirements 202. For example, the pre-programmed system requirements 200 may include, for example, the maximum airflow capacity of the refrigeration unit 20 and the airflow supply and return system 30. For example, the refrigeration unit 20 and the airflow supply and return system 30 may be capable of outputting a predetermined quantity of cooling air. In some instances, the compartments 12 may be set at desired temperatures that exceed the capacity of the refrigeration unit 20 and/or the airflow supply and return system 30. Accordingly, the pre-programmed system operational requirements 202 may instruct the controller 60 how to prioritize the cooling of the various compartments 12. For example, the operational requirements 202 may prioritize the cooling of the compartments 12 based on a difference in actual temperature and desired temperature, wherein the compartment having the largest difference is supplied more cooling air than a compartment having a smaller difference. Additionally, the operational requirements 202 may prioritize the cooling airflow by supplying less cooling air to compartments having food and/or beverages that are to be served initially to the customers and supplying additional cooling air to compartments having food or beverages that are to be served later in the flight.

The operational requirements 202 may also include inputs from the RFID tags shown in FIG. 2. In various embodiments, the controller 60 reads the various RFID tags and supplies cooling air to the galley carts 102 based on the information provided by the RFID tags.

In various embodiments, the operational requirements 202 may be input to the controller 60 via a keypad, touch screen, etc. installed on the controller 60. Optionally, the operational requirements 202 may be input to the controller 60 via an input device 210. The input device 210 may be in the form of a computer having a touch screen, mouse, keypad, etc, that is coupled to the controller 60 and configured to transmit information to and/or from the controller 60. Additionally, the operational requirements 202 may be input via a portable device such as a laptop via the Internet, the LAN, or via a cellular communication device as described above.

In operation, the duct valves 250, which include for example, the compartment supply and return valves 50 and 52 shown in FIG. 2 and the galley cart supply and return valves 140 . . . 150 shown in FIG. 3, are operated by the controller 60 to enable independent and variable airflow control of the cooled discharged from the refrigeration unit 20 and supplied to the refrigerated areas of the system, i.e. the compartments 12 and the galley carts 102. Airflow control may be used to optimize cooling performance and/or completely close off a compartment 12 and/or galley cart 102 after the food has been consumed or if the compartment 12 and/or galley cart 102 is unused for cold food storage for that flight. Thus, only portions of the refrigeration system 10 that are currently being used to store food for a flight are cooled by the refrigeration unit 20. Thus, the electrical power consumed by the refrigeration unit 20 may be reduced during flight.

To enable the refrigeration system 10 to monitor the cooling of the various compartments 12 and/or galley carts 102, the refrigeration system 10 receives real-time feedback from various sensors installed in the various compartments 12, galley carts 102, and the airflow supply and return system 30. Moreover, although various sensors are described in detail above, the refrigeration system 10 may also include sensors for sensing vibration, humidity, duct valve position, refrigeration unit angle (for limiting defrost cycle), cart/container cooling requirements (i.e., from the RFID tag) shown in FIG. 2, among others.

Thus, in operation the refrigeration unit 20 is configured to provide variable air cooling temperatures, variable and independent evaporator and condenser airflow rates, variable compressor pressures and fan speeds to enable the controller 60 to maintain the compartments 12 at the desired temperature. Moreover, the controller 60 substantially continuously monitors the system settings, monitors system performance metrics, monitors ambient conditions, and continuously optimizes system performance.

Additionally, the controller 60 is configured to learn the system characteristics under operating conditions to maximize the performance of the refrigeration system 10. More specifically, the controller may identify using an artificial intelligence based algorithm the most efficient method of cooling the various compartments 12 based on the various inputs received by the controller 60 and the various feedbacks received from the sensors. In various embodiments, the algorithm may be used to generate a training dataset. The training dataset may then be utilized to train the algorithm to identify various characteristics that enable the algorithm to operate the refrigeration system 10 to cool the various compartments 12. Accordingly, in operation, the training dataset may include information of the desired temperatures, the current temperatures, the system performance characteristics, etc. The known values in the training dataset may then be compared to the feedbacks received from the various sensors within the refrigeration system 10 by the controller 60.

Thus, the controller 60 operates the refrigeration system 10 to provide and maintain settable and independent temperature control for a plurality of compartments 12 and galley carts 102 by parsing and distributing the cooled air, at user specified temperatures, to airflow independent compartments 12 or galley carts 102 within the refrigeration system 10 as shown in FIGS. 1, 2 and 3. For example, in one embodiment, the controller 60 operates the refrigeration system 10 to selectively pull down the temperatures of food loaded into the various compartments 12 and/or the galley carts 102 such that for example, the food being served last is cooled first, and the food that is being served first is cooled last, e.g., round trip catering.

The controller 60 also monitors noise levels and adjusts the operational speed of the fan 36 and/or the compressor speeds to minimize the noise levels. The controller 60 also monitors energy being consumed by various components within the refrigeration system 10 and adjusts system settings to minimize energy consumption, e.g. by reducing the operational speed of the fan 36 and/or the compressor, or closing various valves when the food has been removed from one of the compartments 12. The input device 210 accepts preprogrammed system operation criteria as well as on-demand operator instructions.

Figure 4:
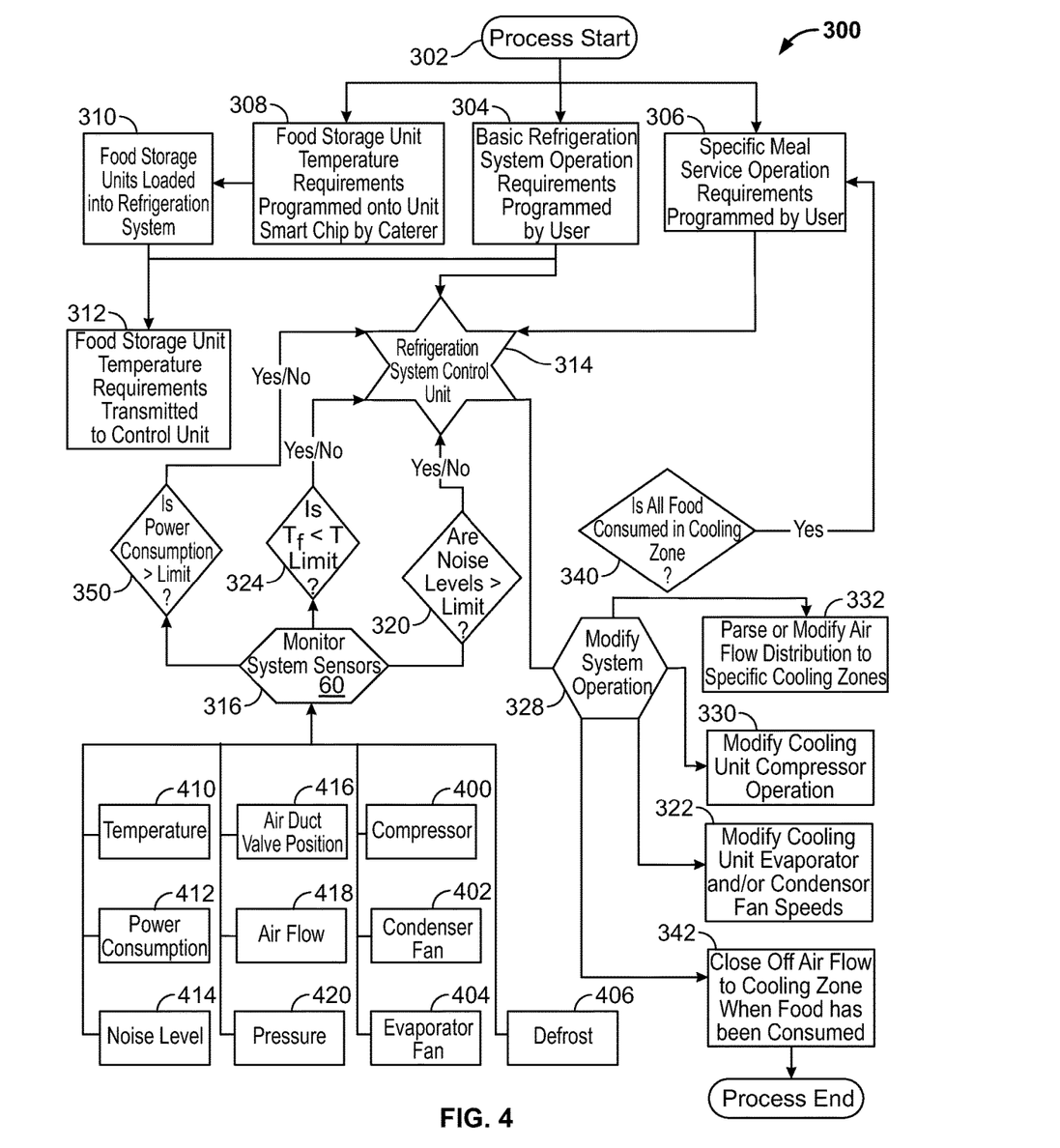
FIG. 4 is an operational schematic illustration of the refrigeration system shown in FIG. 1 in accordance with various embodiments.

FIG. 4 is a schematic illustration of an exemplary method 300 of operating the refrigeration system 10 shown in FIG. 1. In various embodiments, the method 300, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 300 may be able to be used as one or more algorithms to direct hardware to perform one or more operations described herein.

At 302, a process for cooling the compartments 12 and/or galley carts 102 is initiated. At 304, the basic refrigeration system operation requirements are entered by the user. The refrigeration system operation requirements may include, for example, the pre-programmed system operation requirements 202 as described above in FIG. 3. More specifically, the pre-programmed system requirements 200 may include, for example, the maximum airflow capacity of the refrigeration unit 20 and the airflow supply and return system 30 as described above.

At 306, the specific meal service operation requirements are entered by the user. The specific meal service operation requirements may include for example, the food storage unit cooling requirements 200 which include manual inputs from the operator designating a desired temperature for each of the compartments 12 and/or the galley carts 102. In various embodiments, the cooling requirements 200 are based on the type of food or beverage being stored in the respective compartment, the current temperature of the food or beverage being stored, and/or the desired temperature of the food or beverage being stored when the food or beverage is the be served, among others.

At 308, the food service unit temperature requirements are entered by the user. The food service unit temperature unit requirements may also or alternatively include for example, the outputs received from the RFID tags 160, 162, and 164 installed on the galley carts 102.

At 310, one or more food storage units, e.g. one or more galley carts 102, are loaded into a designated compartment 12. At 312, the inputs determined at 304, 306, and 308 are transmitted to the controller 60. In response to the received inputs, at 314 the controller 60 is configured to operate the refrigeration system 10 to satisfy the operational requirements 202 entered as described above.

In various embodiments, at 316, the controller 60 is configured to receive feedback from the various sensors described herein in real-time. The controller 60 may also received feedback from a refrigeration compressor 400, a condenser fan 402, an evaporator fan 404, and a defrost controller 406, etc. The feedbacks may also include temperature inputs 410 from the various temperature sensors described herein, temperature inputs 410 from the various temperature sensors described here, power consumption inputs 412 indicating power consumed by various devices in the refrigeration system 10, noise level inputs 414 from the various noise sensors described herein, air duct valve position 416, and air flow quantity 418, pressure information 420 from the various pressure sensors described herein. In operation, the controller 60 then substantially continuously monitors the various inputs and real-time feedbacks to maintain the desired temperatures within the various compartments and/or galley carts.

For example, in the illustrated embodiment, at 320 the controller 60 determines if the refrigeration unit 20 is operating within the noise limits entered at 304 based on real-time feedback received from the noise sensors, such as the noise sensor 80 shown in FIG. 1. In the exemplary embodiment, the controller 60, at 328 may modify the system operation to maintain the system within the predetermined noise limits. For example, at 330, the controller 60 may be configured to adjust the temperature of the compartments 12 by modifying various components within the refrigeration system 10 using a hierarchical approach. For example, in one embodiment, if the refrigeration unit 20 exceeds the predetermined noise level at 320, the controller 60 may adjust a speed of the fan 36 at 322. It should be realized that if the speed of the fan 36 is reduced at 322 to facilitate reducing the noise level, then the amount of cooling air being supplied to one or more of the compartments 12 may also be reduced. The controller 60 may also modify the airflow distribution to the various compartments at 332 by opening and/or closing various supply and return valves.

Accordingly, at 324 the controller 60 is configured to compare the desired food temperature $T_F$ to the target or limit food temperature $T_{limit}$ within the respective compartment 12. In one embodiment, if $T_F>T_{limit}$, the controller 60, at 326, may transmit a signal to the respective supply and return valves for the compartment 12, to increase the cooling air being supplied to the compartment 12. Optionally, if $T_F<T_{limit}$, the controller 60, at 328, may transmit a signal to the respective supply and return valves for the compartment 12, to reduce the cooling air being supplied to the compartment 12.

Similarly, and referring again to 322, if the refrigeration unit 20 exceeds the predetermined noise level at 320, the controller 60 may adjust a speed of the compressor in the refrigeration unit 20 at 330. It should be realized that if the compressor is reduced at 330 to facilitate reducing the noise level, then the temperature of the cooling air being supplied to one or more of the compartments 12 may also be reduced. Thus, the method proceeds again to step 324 wherein the temperatures are analyzed.

In another embodiment, if the refrigeration unit 20 does not exceed the predetermined noise level at 320, the controller 60 may determine at 350 if the power consumed by the refrigeration unit 20 exceeds a predetermined threshold at 332. If the power consumed does not exceed the predetermined threshold, the controller 60 continues to monitor the feedbacks received from the sensors to maintain the compartments 12 at the desired temperature. In another embodiment, if the power consumed by the refrigeration unit 20 does exceed the predetermined threshold, then at 332, the controller 60 adjusts the refrigeration system as described at 330.

At 340, the controller 60 is also configured to receive inputs from either the user or the galley carts 102 that indicate whether the food within the compartment 12 or the galley cart 102 has been consumed by the passengers and thus cooling air is no longer required to cool either the compartment 12 or the specific galley cart 102. In one embodiment, at 342 if the controller 60 receives an indication that the food is consumed and cooling airflow is no longer required, the controller 60 may operate to close the supply and return valves for the designated compartment 12. Optionally, if the food has not been consumed, the controller 60 is configured to maintain a temperature within the compartment 12 at the desired temperature input by the user.

In operation, the method 300 provides on demand system performance that may be set by the user in flight. The systems and methods described herein may be implemented as part of an airline refrigeration HACCP (Hazard Analysis, and Critical Control Point) system program as shown in FIG. 4. The various embodiments may be utilized with smart food containers, e.g. galley carts having RFID tags, that communicate respective cooling requirements to the controller 60. The controller 60 may be pre-programmed by the airline or food caterer based on a food type, a food service schedule, and/or a specific airline criteria such a energy consumption and/or noise among other factors or criteria. In various embodiments, the controller 60 performs continuous system performance monitoring and on-demand reporting of system performance metrics to the user which may be monitored locally at the controller 60 or remotely from the controller 60.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

What is claimed is:

1. A refrigeration system for providing cooled air to a plurality of galley compartments, the system comprising:
   a plurality of galley compartments configured to receive therein at least one galley cart;
   a refrigeration unit configured to supply cooled air to the plurality of galley compartments;
   an airflow supply and return system coupling the refrigeration unit to the plurality of galley compartments;
   a plurality of valves coupled in the airflow supply and return system for controlling flows of the cooled air through the airflow supply and return system, each valve of the plurality of valves associated with a galley compartment of the plurality of galley compartments; and
   a controller in control communication with the plurality of valves, the controller configured to control the plurality of valves to achieve a first temperature in a first galley compartment of the plurality of galley compartments and a second temperature in a second galley compartment of the plurality of galley compartments, the first temperature being different than the second temperature,
   wherein the controller is configured to receive inputs from the plurality of galley compartments and adjust the plurality of valves based on the received inputs, wherein the inputs received from the galley compartments include compartment temperature, airflow supply temperature, airflow discharge temperature, airflow supply pressure, and airflow discharge pressure.

2. The refrigeration system of claim 1, wherein the controller is configured to:
   receive one or more pre-programmed rules designating a desired operational temperature for at least one of the galley compartments; and
   adjust an operational position of at least one of the plurality of valves to maintain the at least one galley compartment at the desired operational temperature.

3. The refrigeration system of claim 1, wherein the controller is configured to:
   receive a set or pre-programmed rules designating performance priorities for cooling the plurality of compartments, wherein a first performance priority is based on a first difference between a first actual temperature and a first desired temperature within a first galley compartment, and wherein a second performance priority is based on a second difference between a second actual temperature and a second desired temperature within a second galley compartment;
   prioritize cooling of the first and second galley compartments based on a greater of the first difference and the second difference; and
   adjust an operational position of at least one of the plurality of valves based on the pre-programmed rules.

4. The refrigeration system of claim 1, further comprising a fan, the controller being further configured to modify a temperature of the cooling air discharged from the refrigeration unit and an operational speed of the fan to maintain the compartments at the first and second temperatures.

5. The refrigeration system of claim 1, wherein at least one of the compartments is configured to receive a galley cart having a radio frequency identification (RFID) tag installed thereon, the controller configured to receive an output from the RFID tag and maintain a temperature of the galley cart based on the received output from the RFID tag.

6. The refrigeration system of claim 1, wherein the controller is configured to:
   monitor refrigeration system performance metrics using an artificial intelligence algorithm; and
   control the plurality of valves to achieve the first and second temperatures based on the monitored performance metrics.

7. The refrigeration system of claim 1, wherein the controller is further configured to receive a set of meal temperature requirements based on meals being stored in the plurality of galley compartments.

8. A method of operating a refrigeration system for providing cooled air to a plurality of galley compartments, the method comprising:
   receiving, at a controller, a set of refrigeration system operational requirements, the refrigeration system including a refrigeration unit, the plurality of galley compartments, and an airflow supply and return system coupling the refrigeration unit to the plurality of galley compartments, each of the plurality of galley compartments configured to receive therein at least one galley cart;
   receiving, at the controller, a set of meal temperature requirements based on the meals being stored in the galley compartments;
   operating, using the controller, a plurality of valves to achieve a first temperature in a first galley compartment of the plurality of galley compartments and a second temperature in a second galley compartment of the plurality of galley compartments, the first temperature being different than the second temperature;
   positioning a galley cart having a radio frequency identification (RFID) tag installed thereon into one of the plurality of compartments;

receiving, at the controller, an output from the RFID tag; and maintaining a temperature within the galley cart based on the received output from the RFID tag.

9. The method of claim 8, further comprising:
receiving airflow temperature and airflow pressure inputs from the plurality of galley compartments; and
adjusting the plurality of valves based on the airflow temperature and airflow pressure inputs.

10. The method of claim 8, further comprising:
receiving one or more pre-programmed rules designating a desired operational temperature for at least some of the compartments; and
adjusting an operational position the plurality of valves to maintain the compartment at the desired operational temperature.

11. The method of claim 8, further comprising:
receiving one or more pre-programmed rules designating performance priorities for cooling the plurality of galley compartments, wherein a first performance priority is based on a first difference between a first actual temperature and a first desired temperature within a first galley compartment, and wherein a second performance priority is based on a second difference between a second actual temperature and a second desired temperature within a second galley compartment;
prioritizing cooling of the first and second galley compartments based on a greater of the first difference and the second difference; and
adjusting an operational position of the plurality of valves based on the pre-programmed rules.

12. The method of claim 8, further comprising modifying a temperature of the cooling air discharged from the refrigeration unit and an operational speed of a fan to maintain the compartments at the first and second temperatures.

13. The method of claim 8, further comprising:
monitoring performance metrics of the refrigeration system using an artificial intelligence algorithm; and
controlling the plurality of valves to achieve the first and second temperatures based on the monitored performance metrics.

14. A controller for operating an aircraft refrigeration system, the system including a refrigeration unit configured to supply cooled air, an airflow supply and return system coupling the refrigeration unit to a plurality of galley compartments, each galley compartment configured to receive a galley cart therein, and a plurality of valves coupled in the airflow supply and return system for controlling flows of the cooled air through airflow supply and return system, each valve of the plurality of valves associated with a galley compartment of the plurality of galley compartments, said controller programmed to:
receive a set of refrigeration system operation requirements;
receive a set of meal temperature requirements;
operate the plurality of valves to achieve a first temperature in a first galley compartment of the plurality of compartments and a second temperature in a second galley compartment of the plurality of compartments, the first temperature being different than the second temperature;
receive airflow temperature and airflow pressure inputs from the plurality of galley compartments; and
adjust the plurality of valves based on the airflow temperature and airflow pressure inputs.

15. The controller of claim 14, further programmed to:
receive one or more pre-programmed rules designating a desired operational temperature for at least some of the galley compartments; and
adjust an operational position of at least one of the plurality of valves to maintain the galley compartment at the desired operational temperature.

16. The controller of claim 14, further programmed to:
receive one or more pre-programmed rules designating performance priorities for cooling the plurality of galley compartments, wherein a first performance priority is based on a first difference between a first actual temperature and a first desired temperature within a first galley compartment, and wherein a second performance priority is based on a second difference between a second actual temperature and a second desired temperature within a second galley compartment;
prioritize cooling of the first and second galley compartments based on a greater of the first difference and the second difference; and
adjust an operational position of at least one of the plurality of valves based on the pre-programmed rules.

17. The controller of claim 14, further programmed to modify a temperature of the cooling air discharged from the refrigeration unit and an operational speed of a fan to maintain the galley compartments at the first and second temperatures.

18. A refrigeration system for providing cooled air to a plurality of galley compartments, the system comprising:
a plurality of galley compartments configured to receive therein at least one galley cart;
a refrigeration unit configured to supply cooled air to the plurality of galley compartments;
an airflow supply and return system coupling the refrigeration unit to the plurality of galley compartments;
a plurality of valves coupled in the airflow supply and return system for controlling flows of the cooled air through the airflow supply and return system, each valve of the plurality of valves associated with a galley compartment of the plurality of galley compartments; and
a controller in control communication with the plurality of valves, the controller configured to control the plurality of valves to achieve a first temperature in a first galley compartment of the plurality of galley compartments and a second temperature in a second galley compartment of the plurality of galley compartments, the first temperature being different than the second temperature,
wherein the controller is configured to:
receive a set or pre-programmed rules designating performance priorities for cooling the plurality of compartments, wherein a first performance priority is based on a first difference between a first actual temperature and a first desired temperature within a first galley compartment, and wherein a second performance priority is based on a second difference between a second actual temperature and a second desired temperature within a second galley compartment;
prioritize cooling of the first and second galley compartments based on a greater of the first difference and the second difference; and
adjust an operational position of at least one of the plurality of valves based on the pre-programmed rules.

19. The refrigeration system of claim 18, wherein the controller is configured to:
receive one or more pre-programmed rules designating a desired operational temperature for at least one of the galley compartments; and
adjust an operational position of at least one of the plurality of valves to maintain the at least one galley compartment at the desired operational temperature.

20. The refrigeration system of claim 18, further comprising a fan, the controller being further configured to modify a temperature of the cooling air discharged from the refrigeration unit and an operational speed of the fan to maintain the compartments at the first and second temperatures.

21. The refrigeration system of claim 18, wherein at least one of the compartments is configured to receive a galley cart having a radio frequency identification (RFID) tag installed thereon, the controller configured to receive an output from the RFID tag and maintain a temperature of the galley cart based on the received output from the RFID tag.

22. The refrigeration system of claim 18, wherein the controller is configured to:
monitor refrigeration system performance metrics using an artificial intelligence algorithm; and
control the plurality of valves to achieve the first and second temperatures based on the monitored performance metrics.

23. The refrigeration system of claim 18, wherein the controller is further configured to receive a set of meal temperature requirements based on meals being stored in the plurality of galley compartments.

24. A controller for operating an aircraft refrigeration system, the system including a refrigeration unit configured to supply cooled air, an airflow supply and return system coupling the refrigeration unit to a plurality of galley compartments, each galley compartment configured to receive a galley cart therein, and a plurality of valves coupled in the airflow supply and return system for controlling flows of the cooled air through airflow supply and return system, each valve of the plurality of valves associated with a galley compartment of the plurality of galley compartments, said controller programmed to:
receive a set of refrigeration system operation requirements;
receive a set of meal temperature requirements;
operate the plurality of valves to achieve a first temperature in a first galley compartment of the plurality of compartments and a second temperature in a second galley compartment of the plurality of compartments, the first temperature being different than the second temperature;
receive one or more pre-programmed rules designating a desired operational temperature for at least some of the galley compartments; and
adjust an operational position of at least one of the plurality of valves to maintain the galley compartment at the desired operational temperature.

25. The controller of claim 24, further programmed to:
receive one or more pre-programmed rules designating performance priorities for cooling the plurality of galley compartments, wherein a first performance priority is based on a first difference between a first actual temperature and a first desired temperature within a first galley compartment, and wherein a second performance priority is based on a second difference between a second actual temperature and a second desired temperature within a second galley compartment;
prioritize cooling of the first and second galley compartments based on a greater of the first difference and the second difference; and
adjust an operational position of at least one of the plurality of valves based on the preprogrammed rules.

26. The controller of claim 24, further programmed to modify a temperature of the cooling air discharged from the refrigeration unit and an operational speed of a fan to maintain the galley compartments at the first and second temperatures.

27. A refrigeration system for providing cooled air to a plurality of galley compartments, the system comprising:
a plurality of galley compartments configured to receive therein at least one galley cart, wherein at least one of the compartments is configured to receive a galley cart having a radio frequency identification (RFID) tag installed thereon;
a refrigeration unit configured to supply cooled air to the plurality of galley compartments;
an airflow supply and return system coupling the refrigeration unit to the plurality of galley compartments;
a plurality of valves coupled in the airflow supply and return system for controlling flows of the cooled air through the airflow supply and return system, each valve of the plurality of valves associated with a galley compartment of the plurality of galley compartments; and
a controller in control communication with the plurality of valves, the controller configured to control the plurality of valves to achieve a first temperature in a first galley compartment of the plurality of galley compartments and a second temperature in a second galley compartment of the plurality of galley compartments, the first temperature being different than the second temperature, the controller configured to receive an output from the RFID tag and maintain a temperature of the galley cart based on the received output from the RFID tag.

28. The refrigeration system of claim 27, wherein the controller is configured to:
receive one or more pre-programmed rules designating a desired operational temperature for at least one of the galley compartments; and
adjust an operational position of at least one of the plurality of valves to maintain the at least one galley compartment at the desired operational temperature.

29. The refrigeration system of claim 27, further comprising a fan, the controller being further configured to modify a temperature of the cooling air discharged from the refrigeration unit and an operational speed of the fan to maintain the compartments at the first and second temperatures.

30. The refrigeration system of claim 27, wherein the controller is configured to:
monitor refrigeration system performance metrics using an artificial intelligence algorithm; and
control the plurality of valves to achieve the first and second temperatures based on the monitored performance metrics.

31. The refrigeration system of claim 27, wherein the controller is further configured to receive a set of meal temperature requirements based on meals being stored in the plurality of galley compartments.

32. A controller for operating an aircraft refrigeration system, the system including a refrigeration unit configured to supply cooled air, an airflow supply and return system coupling the refrigeration unit to a plurality of galley compartments, each galley compartment configured to receive a galley cart therein, and a plurality of valves coupled in the airflow supply and return system for controlling flows of the cooled air through airflow supply and return system, each valve of the plurality of valves associated with a galley compartment of the plurality of galley compartments, said controller programmed to:

receive a set of refrigeration system operation requirements;

receive a set of meal temperature requirements;

operate the plurality of valves to achieve a first temperature in a first galley compartment of the plurality of compartments and a second temperature in a second galley compartment of the plurality of compartments, the first temperature being different than the second temperature;

receive one or more pre-programmed rules designating performance priorities for cooling the plurality of galley compartments, wherein a first performance priority is based on a first difference between a first actual temperature and a first desired temperature within a first galley compartment, and wherein a second performance priority is based on a second difference between a second actual temperature and a second desired temperature within a second galley compartment;

prioritize cooling of the first and second galley compartments based on a greater of the first difference and the second difference; and adjust an operational position of at least one of the plurality of valves based on the pre-programmed rules.

33. The controller of claim 32, further programmed to modify a temperature of the cooling air discharged from the refrigeration unit and an operational speed of a fan to maintain the galley compartments at the first and second temperatures.

* * * * *